(12) United States Patent
McBride et al.

(10) Patent No.: US 11,599,755 B1
(45) Date of Patent: Mar. 7, 2023

(54) SYSTEMS AND METHODS FOR ON-DEMAND MOBILE DEVICE POSTAGE PRINTING AND USER ACCESS TO PRINTED POSTAGE INDICIUM

(71) Applicant: Stamps.com Inc., El Segundo, CA (US)

(72) Inventors: Kenneth Thomas McBride, Hermosa Beach, CA (US); John Roland Clem, Hermosa Beach, CA (US)

(73) Assignee: Auctane, Inc., Austin, TX (US)

( * ) Notice: Subject to any disclaimer, the term of this patent is extended or adjusted under 35 U.S.C. 154(b) by 1461 days.

(21) Appl. No.: 15/832,429

(22) Filed: Dec. 5, 2017

Related U.S. Application Data

(63) Continuation of application No. 13/172,066, filed on Jun. 29, 2011, now abandoned.

(51) Int. Cl.
  *G06Q 50/32* (2012.01)
  *G06Q 50/30* (2012.01)
  (Continued)

(52) U.S. Cl.
  CPC ......... *G06K 15/007* (2013.01); *G06K 15/021* (2013.01); *G06Q 30/0283* (2013.01);
  (Continued)

(58) Field of Classification Search
  CPC ............... G06K 15/007; G06K 15/021; G06K 19/06037; G06K 2019/06253; G06Q 2250/70; G06Q 30/0283; G06Q 50/32
  See application file for complete search history.

(56) References Cited

U.S. PATENT DOCUMENTS 5,943,658 A * 8/1999 Gravell .............. G07B 17/0008
  705/410
5,983,209 A 11/1999 Kara
  (Continued)

OTHER PUBLICATIONS

Quick Service Guid 604c (USPS, "Quick Service Guide 604c", https://pe.usps.com/qsg_archive/html/qsg_archive_20060108/qsg300/q604c.htm, Jan. 2006 (Year: 2006).*

*Primary Examiner* — Resha Desai
*Assistant Examiner* — Michelle E Carey
(74) *Attorney, Agent, or Firm* — Pillsbury Winthrop Shaw Pittman, LLP

(57) ABSTRACT

Systems and methods which provide postage indicia using mobile communication handsets are shown. According to embodiments, users are enabled to introduce mail pieces into a mail delivery stream which are accepted as having acceptable postage indicia having value associated therewith without the use of traditional metering systems or processor-based postage generation and printing systems. Instead, a mobile communication handset is used to obtain tokens to be used as postage indicia. The tokens may be transmitted to or otherwise printed by appropriate, available printing equipment, such as facsimile machines, network printers, network photo copiers, etc., in response to a request by a mobile communication handset for postage indicia. The foregoing tokens may be printed upon various stock for inclusion with or as a mail piece. The mail piece bearing the token may be placed into the mail stream for processing and delivery using the token as activated as postage indicia.

18 Claims, 3 Drawing Sheets

(51) Int. Cl.
  *G06Q 30/02* (2012.01)
  *G06K 15/00* (2006.01)
  *G06K 15/02* (2006.01)
  *G06Q 30/0283* (2023.01)
  *G06K 19/06* (2006.01)

(52) U.S. Cl.
  CPC .................. *G06K 19/06037* (2013.01); *G06K 2019/06253* (2013.01); *G06Q 2250/70* (2013.01)

(56) References Cited

U.S. PATENT DOCUMENTS

| | | | |
|---|---|---|---|
| 7,375,841 B1 * | 5/2008 | Polis | B29B 17/0036 358/1.18 |
| 7,458,612 B1 | 12/2008 | Bennett | |
| 7,954,709 B1 | 6/2011 | Leon et al. | |
| 8,100,324 B1 | 1/2012 | Leon | |
| 8,240,579 B1 | 8/2012 | Bennett | |
| 8,626,673 B1 | 1/2014 | Bennett | |
| 2009/0254426 A1 * | 10/2009 | Rodriguez | G06Q 10/083 705/330 |
| 2010/0127490 A1 * | 5/2010 | Novack | G07B 17/00193 283/71 |

* cited by examiner

SYSTEMS AND METHODS FOR ON-DEMAND MOBILE DEVICE POSTAGE PRINTING AND USER ACCESS TO PRINTED POSTAGE INDICIUM

CROSS-REFERENCE TO RELATED APPLICATIONS

The present application is a continuation of U.S. patent application Ser. No. 13/172,066, filed on Jun. 29., 2011 which is related to co-pending and commonly assigned U.S. patent applications Ser. No. 13/110,476 entitled "Systems and Methods Using Mobile Communication Handsets for Providing Postage," filed May 18, 2011, Ser. No. 11/616,546 entitled "System and Method for Handling Payment Errors with Respect to Delivery Services," filed Dec. 27, 2006, Ser. No. 11/616,569 entitled "Postage Metering with Accumulated Postage," filed Dec. 27, 2006, Ser. No. 12/030,739 entitled "Systems and Methods for Distributed Activation of Postage," filed Feb. 13, 2008, Ser. No. 12/103,496 entitled "Systems and methods for Activation of Postage Indicia at Point of Sale," filed Apr. 15, 2008, Ser. No. 12/553,824 entitled "Systems and methods for Payment of postage indicia After the Point of Generation," filed Sep. 3, 2009, Ser. no. 11/729,148 entitled "Computer-Based Value-Bearing Item Customization Security," filed Mar. 27, 2007, and Ser. No. 12/316,240 entitled "Systems and Methods for Facilitating Replacement of Computer-Based Value-Bearing Items," filed Dec. 9, 2008, the disclosures of which are hereby incorporated herein by reference.

TECHNICAL FIELD

The present invention relates to postage indicia and, more particularly, to providing postage indicia using mobile communication handsets.

BACKGROUND OF THE INVENTION

The use of postage indicia in place of traditional postage stamps has become wide spread. Dedicated postage meters, for example, configured to strike postage indicia imprints upon envelopes and labels have been in use for many years. Such postage meters include a postage value vault and controlled printing mechanism which will strike postage indicia and debit a corresponding amount of value from the postage value vault under control of user input. The postage meters are typically somewhat bulky due at least in part to the security measures implemented to thwart fraudulent postage indicia strikes. Moreover, obtaining postage value credit refill is often a complicated and cumbersome task. Accordingly, the use and management of such postage meters is less than ideal for many users.

Solutions for generating and printing valid postage indicia using a home or office processor-based system, such as a personal computer (PC), have been provided by Stamps.com Inc., Los Angeles, Calif. (the assignee of the present application) for a number of years. The postage indicia generated by such processor-based systems has typically been an information based indicia (IBI), wherein a barcode (e.g., two-dimensional barcode) carries information useful for validating the indicia when placed in the mail stream. Such solutions have facilitated ad-hoc generation and printing of postage indicia, such as to generate and print individual postage indicia for a particular mail piece. Although providing significantly more convenience than traditional postage meters for many users, these processor-based systems continue to utilize relatively bulky printers (e.g., ink jet or laser printers) for imprinting postage indicia upon an envelope or label.

Although providing a very convenient solution for providing valid postage to individuals and businesses upon demand, 24 hours a day, 7 days a week, the foregoing solutions may not address every situation. For example, a user may not utilize a sufficient amount of postage to justify the lease of a traditional postage meter or otherwise may not wish to obtain and manage such a dedicated use system. A user may not be comfortable with processor-based technology and thus be reluctant to utilize PC based postage systems to generate and print postage. A user, although regularly using such processor-based system, may have insufficient supplies on hand (e.g., label stock, printer ink/toner, etc.) to print postage indicia. Similarly, a user may be traveling and thus not have a postage meter, PC based postage system, or even a suitable printer available for their use in generating and printing postage indicia.

Even where a user has access to the appropriate equipment for generating and printing postage indicia, such solutions may not be ideal for the user. For example, the generation of postage indicia is typically preceded by debiting the user's postage value account (e.g., the aforementioned postage value vault) in order to prevent the printing of valuable postage indicia without proper payment for that value. However, should a postage meter print mechanism malfunction, a host PC processor cease to operate, an envelope or label be positioned improperly, etc. a postage indicia misprint may occur. The user is then typically put to the task of proving that a misprint has occurred in order to receive a refund of the associated value. Issues such as this can result in some users resisting adoption of the foregoing metering technology.

Techniques for batch generation and printing of postage indicia, such as to generate and print plural postage indicia for later use with various mail pieces, have been provided which can provide a suitable solution for some users. For example, a user may utilize a web interface provided by Stamps.com Inc. to generate and print a sheet of "generic" postage indicia, perhaps using uniquely serialized stock, for use with mail pieces much like a more traditional sheet of stamps may be used. Such generic postage indicia is not linked to a particular mail piece and thus may be used with any appropriate mail piece as needed. However, the postage indicia would be provided in some standard denomination(s) which may not be correct for a particular mail piece. This can lead to returned mail due to under payment or loss of value due to over payment. Moreover, the postage indicia, once generated, have value and are subject to inappropriate use and pilferage.

BRIEF SUMMARY OF THE INVENTION

The present invention is directed to systems and methods which provide postage indicia using mobile communication handsets. According to embodiments of the invention, users are enabled to introduce mail pieces into a mail delivery stream which are accepted as having acceptable (e.g., activated or activatable), postage indicia having value associated therewith without the use of traditional metering systems or processor-based postage generation and printing systems. Instead, a mobile communication handset (e.g., a standard, commercially available, widely used mobile communication handset) is used to obtain tokens to be used as postage indicia. For example, tokens may be transmitted to or otherwise printed by appropriate, available equipment, such as facsimile machines, network printers, network photo copiers, etc., in response to a request by a mobile communication handset for postage indicia. Such tokens may be activated as postage indicia having postage value at various times, such as when transmitted to/received by a user, when introduced into the mail stream, etc. Accordingly, a large percentage of the population, whether at home, in the office, or traveling, may be enabled to obtain postage on demand using systems and methods of the present invention.

In operation according to embodiments of the invention, a user requests a postage indicium using a mobile communication handset. The request may comprise or otherwise have associated therewith information regarding the desired postage indicium (e.g., value, class of service, type of indicium, number of indicia requested, etc.), information regarding the mail item for which the postage indicium is requested (e.g., weight, size, addressee, addressor, contents, etc.), information regarding the mobile communication handset (e.g., information identifying the handset, account information, location information, etc.), and/or the like. Requests according to embodiments of the invention may comprise or otherwise have associated therewith information regarding printing of the desired postage indicium, such as information regarding a print format (e.g., high resolution printing format, low resolution printing format, machine readable printing format, human readable printing format, etc.), printing equipment identification (e.g., phone number of a facsimile machine to be used in printing the postage indicium, network address of a printer to be used in printing the postage indicium, identification of a selected business service providing printing equipment to be used in printing the postage indicium, etc.), and/or the like.

The foregoing request is transmitted by the mobile communication handset to a postage server system for issuing of a token to be used as the desired postage indicium in response thereto. For example, the user may use a short message service (SMS), electronic mail, or other communication resource of the mobile communication handset to communicate the request for a postage indicium to the postage server system. In operation according to embodiments, the postage server system may generate a token for use as the requested postage indicium (e.g., using information included in the request and/or other information available to the postage server system) or may select a preexisting token for use as the requested postage indicium (e.g., associating information included in the request and/or other information available to the postage server system with the preexisting token).

The tokens utilized according to embodiments of the invention comprise, or have associated therewith, information identifying or otherwise tying the token to the particular mobile communication handset used in requesting postage indicia. For example, handset tying information may be in the form of a code or symbol (e.g., barcode, character string, etc.) comprising information unique to the mobile communication handset and/or an account associated therewith, such as the mobile communication handset electronic serial number (ESN), mobile identification number (MIN), subscriber identification module (SIM) unique serial number or integrated circuit card identifier (ICCID), international mobile subscriber identity (IMSI), handset telephone number, media access control (MAC) address, Internet protocol (IP) address, etc. This handset tying information may be utilized for purposes such as accounting, tracking, auditing, and/or fraud detection with respect to postage indicia provided in accordance with embodiments of the invention.

Additionally or alternatively, tokens utilized according to embodiments of the invention comprise substantially unique identification information, whether in the form of a code or symbol (e.g., barcode, character string, etc.) for identifying the particular token. For example, substantially unique identification information may comprise information identifying a mail piece (e.g., letter, envelope, package, etc.) to which the postage indicia is associated or may be arbitrary with respect to the mail piece. Substantially unique identification information may comprise the aforementioned handset tying information, or some portion thereof, in combination with other information (e.g., sequence number, date/time information, information identifying a mail piece, etc.), referred to herein as uniqueizing information, to render the identification information substantially unique to the token (e.g., uniqueizing information when combined with some other information tends to render the combined information unique or substantially unique). Such substantially unique identification information may be utilized for identifying the token for purposes such as accounting, tracking, auditing, and/or fraud detection with respect to postage indicia provided in accordance with embodiments of the invention.

The handset tying information and/or substantially unique information of the tokens may be utilized to facilitate enhanced services according embodiments of the invention. For example, associating unactivated tokens with a particular user or user account may be utilized to facilitate payment for postage, and thus activation of the token, after a mail piece is introduced into the mail stream (e.g., if a user inadvertently fails to activate the token prior to introducing the mail piece into the mail stream). The use of a mobile communication handset in activating a token provides information regarding how the user may contacted, such as for automatically providing tracking information, delivery notification, etc.

The foregoing tokens are to be activated as a postage indicium or postage indicium information, comprising value (referred to herein as postage value) associated therewith, to be used as the requested postage indicium. Such activation may be provided before transmission of the token to a user, after receipt of the token by the user, after introduction of an associated mail piece into the mail stream, etc. Activation according to embodiments of the invention is performed in association with debiting an appropriate account for an amount of the postage value. However, embodiments of the invention may utilize post-paid techniques, wherein activation of a token as postage indicium is performed prior to debiting a user's account for an amount of the postage value.

Activation of postage in accordance with embodiments herein may utilize various techniques to determine an appropriate amount for the postage value. For example, rather than a user inputting a desired amount of postage, the mobile communication handset and/or the postage server system may operate to calculate the appropriate amount of postage. In some embodiments, mobile communication handsets may be provided with postal scale circuitry to provide mail piece weight for use in providing postage indicia. In operation according to embodiments of the invention, information from the mail piece itself (e.g., as may be determined from one or more image of the mail piece contents) may be utilized by logic of the mobile communication handset and/or postage server system in determining an appropriate amount of postage value for a postage indicium activated according to the concepts herein.

Whether performed as part of a token activation process or thereafter, an account (e.g., user's postage account, user's mobile communication handset account, user' prepaid account, user's postpaid account, etc.) is preferably debited by an amount appropriate to the postage value of a postage indicium provided using the aforementioned tokens. For example, an appropriate account may be debited upon selection or generation of the token. Alternatively, an appropriate account may be debited after providing the token to a user for use as postage indicium, such as at a time of use (e.g., after a mail item bearing the postage indicium has been introduced into the mail stream). Such postage value, and the corresponding account debit, may be in any value according to embodiments of the invention, such as a value selected by the user, a value determined to be appropriate to the mail piece, a value calculated to provide for both a postage fee and a service fee, etc. Information identifying an appropriate account may be provided to a postage server system in or accompanying the aforementioned request and/or the token itself. For example, a token used for activation as a postage indicium may include account information (e.g., user identification information, handset tying information, account identification information, etc.) therein. Additionally or alternatively, such account information may be provided separate from the token itself.

In operation according to embodiments of the invention, the postage server system provides the token to a user for use as the requested postage indicium. For example, the postage server system may transmit the token to printing equipment identified by the user in the request or which is otherwise available for use in printing the token. The postage server system may transmit a message to the mobile communication handset or other user terminal (e.g., using SMS, electronic mail, or other communication resource) to provide notice that the token has been provided to the printing equipment and/or to provide information to locate or identify the particular printing equipment. Additionally or alternatively, the postage server system may provide the token to the mobile communication handset or other user terminal (e.g., using SMS, electronic mail, or other communication resource). For example, a token may be provided to the mobile communication handset for printing under control of the user (e.g., using a wireless local area network (WLAN) connection, such as a WiFi or WiMAX network connection, a wired connection, a BLUETOOTH connection, etc.). Similarly, a token may be provided to the mobile communication handset for application upon the mail piece (e.g., handwritten upon the mail piece).

The foregoing tokens may be printed upon various media, such as mail stock (e.g., envelopes, flats, boxes, etc.), document stock (e.g., letter stock), label stock (e.g., postage indicia labels, address labels, shipping labels, etc.), and/or the like (collectively referred to as mail piece stock), for inclusion with or as a mail piece. The mail piece bearing the token may be placed into the mail stream for processing and delivery using the token as activated as postage indicia.

Tokens utilized according to embodiments of the invention for providing postage indicia may be processed in a number of ways once introduced into the mail stream. For example, an open loop technique may be implemented with respect to certain tokens whereby the tokens are scanned by a validation system and the mail piece allowed to continue in the mail stream. The token may subsequently be analyzed, such as by the validation system and/or a postage server system, to determine if appropriate postage value (e.g., as indicated by an associated postage indicium or postage indicium information) is associated therewith. If a no postage value, or if a deficient postage value, is associated with the token an appropriate account may be debited accordingly. Additionally or alternatively, a closed loop technique may be implemented with respect to certain tokens whereby the tokens are scanned by a validation system and the mail piece not allowed to continue in the mail stream until the token is analyzed. For example, the token may be analyzed, such as by a validation system and/or a postage server system, to determine if appropriate postage value (e.g., as indicated by an associated postage indicium or postage indicium information) is associated therewith. If appropriate postage value is associated with the token the mail piece may be allowed to continue in the mail stream. However, if a no postage value, or if a deficient postage value, is associated with the token the mail piece may be prevented from continuing in the mail stream (e.g., returned to the sender).

It should be appreciated that although mobile communication handsets in their "off-the-shelf" state may be utilized in providing postage indicia according to embodiments of the invention, added logic and/or circuitry may be utilized according to alternative embodiments. For example, postage indicia acquisition logic (e.g., in the form of a smart phone application) may be provided for a smart phone type mobile communication handset which automates token request, acquisition, and/or printing operation as described herein. Additionally or alternatively, the aforementioned postal scale circuitry (e.g., in the form of a scale dongle, sleeve, etc. connectable to a data interface of the mobile communication handset) may be provided for a smart phone type mobile communication handset to provide mail piece weight for use in providing postage indicia.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
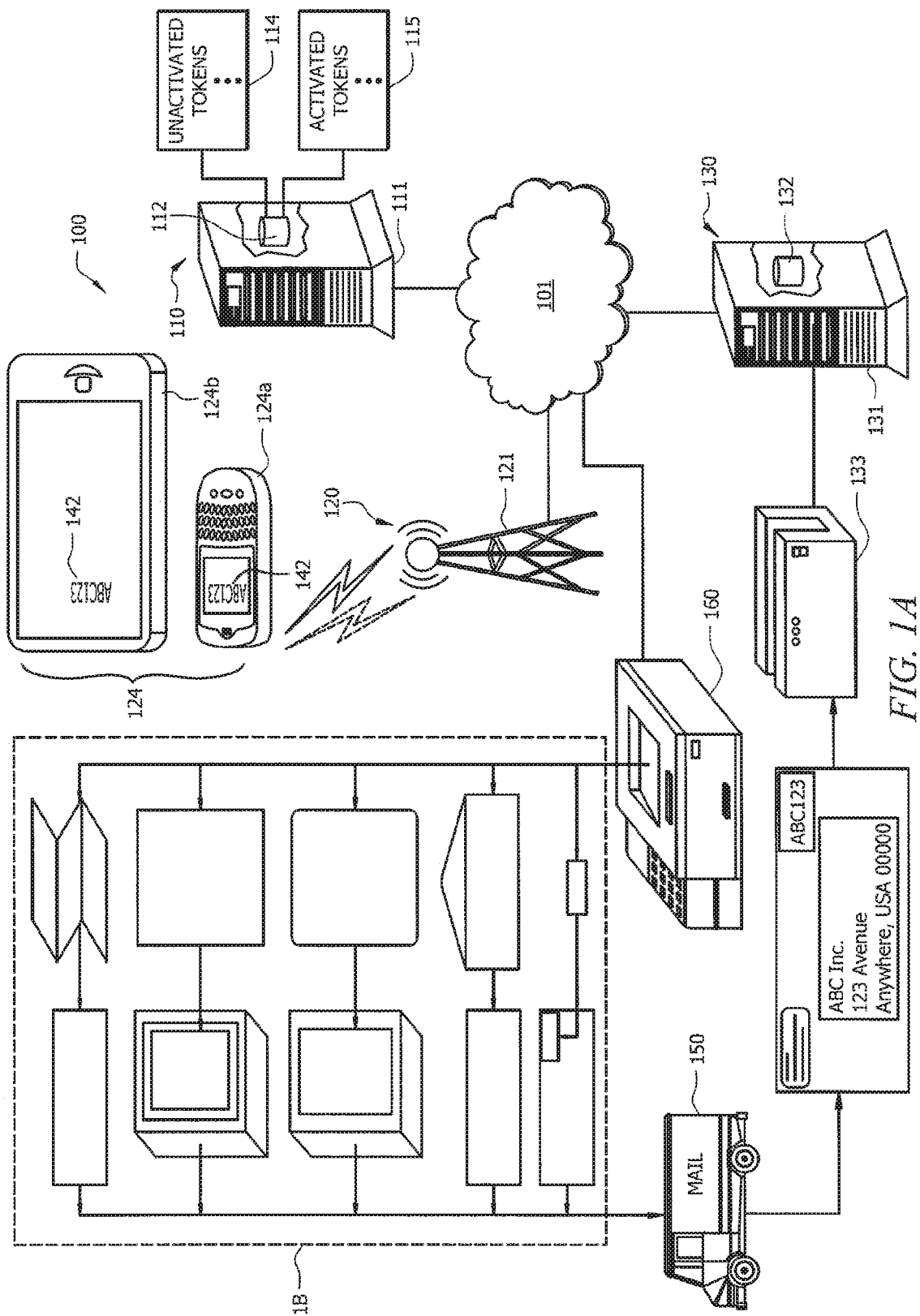
FIG. 1A shows a system adapted to provide postage using a mobile communication handset according to embodiments of the present invention.

Directing attention to FIG. 1A, a system adapted to provide postage indicia using mobile communication handsets according to embodiments of the invention is shown as system 100. System 100 of the illustrated embodiment comprises postage server system 110, communication system 120, and validation system 130, in communication through network 101, cooperating to provide postage indicia. Printing equipment 160 is also shown in communication with postage server system 110, communication system 120, and/or validation system 130, through network 101 of the illustrated embodiment for use in printing tokens used as postage indicia.

Network 101 of the illustrated embodiments provides information communication between postage server system 110, communication system 120, and validation system 130. The foregoing systems may be disposed locally or remotely with respect to one another. For example, postage server system 110 and validation system 130 may be disposed locally with respect to each other (e.g., at a postal system facility), whereas communication system 120 may be disposed remotely with respect to postage server system 110 and validation system 130. Of course, postage server system 110 and validation system 130 may be disposed remotely with respect to each other, if desired. Accordingly, network 101 of embodiments may comprise the Internet, an intranet, an extranet, a local area network (LAN), a metropolitan area network (MAN), a wide area network (WAN), the public switched telephone network (PSTN), a wireless network, a cable transmission system, a satellite communication network, and/or the like.

Mobile communication handset 124 as utilized to request postage indicia according to concepts herein preferably comprises a processor-based system, such as computers having a CPU, memory, and appropriate I/O devices and interfaces, operable under control of instruction sets defining operation as described herein. For example, mobile communication handset 124 may comprise a smart phone (e.g., smart phone 124a such as may comprise an IPHONE available from Apple Computer Corp., an ANDROID based phone available from various manufacturers, a BLACKBERRY available from Research In Motion, etc.), a network enabled personal digital assistant (e.g., PDA 124b such as may comprise an IPAQ available from Hewlett Packard Corp., an IPAD available from Apple Computer Corp., etc.), and/or the like. Mobile communication handset 124 of embodiments may operate under control of an instruction set (e.g., a smart phone application adapted for use in providing postage indicia) to provide operation as described herein. Additionally or alternatively, resources of mobile communication handset 124 not specifically adapted for providing postage indicia may be used. For example, embodiments may utilize a network browser application, a text messaging (e.g., SMS) application, an email client application, etc. in requesting and obtaining postage indicia herein.

In addition to or in the alternative to the foregoing, mobile communication handsets of embodiments may utilize various applications to facilitate providing postage indicia. For example, an application adapted to locate suitable printing equipment and/or to communicate with printing equipment may be utilized according to embodiments of the invention. Likewise, an application for determining the present location of the mobile communication handset (e.g., a global positioning system (GPS) application and associated GPS receiver circuitry, a radio frequency (RF) signature location application and associated RF signature database, etc.).

Mobile communication handset 124 is adapted to communicate with various other systems (e.g., other mobile communication handsets, computer systems, network systems, etc.) via components (e.g., base station 121) of communication system 120. Accordingly, mobile communication handset 124 of embodiments comprises communication circuitry, such as radios (e.g., transceivers operable in accordance with cellular and/or data communications protocols). Moreover, mobile communication handset 124 may comprise various additional or alternative interfaces (e.g., an Ethernet link, a universal serial bus (USB) link, a fiber optic link, etc.) useful for providing communications with systems and equipment (e.g., postage server 110, printing equipment 160, etc.).

Mobile communication handset 124 of embodiments utilizes one or more resource of communication system 120 (e.g., base station 121) to communicate a request for postage indicia to postage server system 110 for generation or selection of tokens for providing postage indicia according to the concepts of the present invention. Such a request for postage indicia may include, or have associated therewith, handset tying information, mail piece information, stock information, account information, location information, and/or printing equipment information for use in providing and activating tokens as postage indicia herein.

Various forms of input regarding the forgoing information may be utilized according to embodiments of the invention, such as a keyboard, a microphone, a host system, a peripheral device, etc. For example, a keyboard of mobile communication handset 124 may be utilized to input postage account information, such as where the mobile communication handset information is not used to identify an appropriate account. A peripheral device may additionally or alternatively be provided for input of information according to embodiments of the invention. For example , a scale (not shown) may be utilized to input mail piece weight information, such as for use in rating postage in order to determine an appropriate or desired amount of postage value for activated postage indicia.

In one embodiment, a scale may be provided as a sleeve which slides over and closely fits the form of mobile communication handset 124 and having a load sensor disposed therein. The circuitry of such a sleeve may couple to mobile communication handset 124 via a data interface thereof to provide operation wherein mobile communication handset 124 is placed upon a hard surface and a mail piece placed on mobile communication handset 124 for a determination of the weight of the mail piece. Alternatively, a scale module, such as in the form of a dongle, may be coupled to a data interface of mobile communication handset 124 for use in determining the weight of mail pieces. Such a dongle may provide a configuration wherein the dongle, or portion thereof, is rested upon a hard surface and the mail piece placed thereon to determine the weight. Alternatively, such a dongle may provide a configuration wherein the mail piece is suspended from the dongle (e.g., by a hook or a clip) while the dongle, or portion thereof, is itself suspended to determine the weight of the mail piece.

It should be appreciated that rather than being a separate device coupled to the mobile communication handset, circuitry operable to function as a mail piece scale may be integrated into a mobile communication handset. For example, a load sensor may be integrated into a back surface of a mobile communication handset whereby, in use, the mobile communication handset may be placed upon a hard surface and the mail piece placed upon the mobile communication handset in order for the load sensor to measure the weight of the mail piece.

Although embodiments of the invention may utilize a scale, as discussed above, it should be appreciated that the use of such a scale is not a limitation of embodiments herein. For example, embodiments may provide postage in amounts selected by a user (e.g., similar to how a user currently estimates the number of stamps needed for a mail piece without the use of a scale), in flat rate amounts (e.g., using a flat rate program as currently offered by the United States Postal Service (USPS) as their PRIORITY MAIL FLAT RATE shipping program), etc. Additionally or alternatively, embodiments of the invention may operate to determine appropriate postage amounts using means other than a scale, such as using the postage by context techniques shown and described in U.S. Pat. No. 5,983,209, the disclosure of which is incorporated herein by reference. Logic of the mobile communication handset and/or postage server system may operate to analyze mail piece information (e.g., images of the mail piece contents, information regarding number and size of mail piece contents, etc.) to determine appropriate postage amounts using the foregoing postage by context techniques. For example, a number of pages, and perhaps the size of the pages, may be determined from one or more images taken of the mail piece, whereby this information is used in determining or estimating an appropriate amount of postage.

It should be appreciated that information used in requesting postage indicia according to embodiments of the invention may not be input in the strictest sense. For example, handset tying information may be natively present in the mobile communication handset (e.g., in a memory, a SIM card, etc.). Additionally or alternatively, some portion of the information used in requesting postage indicia may be obtained from a database or other knowledge base, whether internal to or external to mobile communication handset 124.

Information for use in providing postage indicia, such as token information, handset tying information, substantially unique identification information, mail piece information, user identification information, account information, etc., is preferably provided by mobile communication handset 124 to postage server system 110 for activation of tokens and providing postage indicia. Communication system 120 preferably provides communication of requests for postage indicia and tokens and/or other information in response to such requests. Accordingly, a communication interface of mobile communication handset 124 (e.g., a radio transceiver) may be utilized to communicate with postage server system 110 via base station 121 and network 101. It should be appreciated that, although embodiments are described herein with reference to the use of wireless links with respect to mobile communication handsets, embodiments of the invention may utilize wired connections (e.g., an Ethernet link, a USB link, a fiber optic link, etc.) with respect to mobile communication handsets.

Communication system 120 comprises a communication network, represented by base station 121, and a plurality of mobile communication handsets, a representative one of which is mobile communication handset 124. In accordance with an embodiment of the present invention, communication system 120 may provide a wireless communication network, such as may comprise a cellular telephone network (e.g., a Global System for Mobile Communications (GSM) network, an International Mobile Telecommunications-2000 (IMT-2000 or 3G) network, a long term evolution (LTE) network, a 4G network, etc.), a wireless broadband data network (e.g., a wireless LAN network, a WiFi network, a WiMAX network, a general packet radio service (GPRS) network, etc.), and/or the like providing communication to/from user equipment including mobile communication handsets, printing equipment, etc. It should be appreciated that, although communication system 120 has been described above with reference to wireless communication networks, embodiments of communication system 120 may comprise wired networks, such as the Internet, an intranet, an extranet, a LAN, a MAN, a WAN, the PSTN, a cable transmission system, and/or the like.

Postage server system 110 preferably comprises a processor-based system, such as a computer having a central processing unit (CPU), memory (shown as including database 112), and appropriate input/output (I/O) devices and interfaces, operable under control of an instruction set defining operation as described herein. For example, postage server system 110 may comprise server platform 111 having a processor from the CORE family of processors available from Intel Corporation, Santa Clara, California. Postage server system 110 of the illustrated embodiment provides generation/selection, printing, and activation of tokens for use in providing postage indicia as described below. Accordingly, postage server system 110 of the illustrated embodiment includes database 112 for storage of tokens, token identification, and/or token status (e.g., as may be provided in unactivated token database 114 and activated token database 115).

Postage server system 110 of embodiments provides tokens for use as postage indicia according to the concepts herein in a number of configurations. The tokens of embodiments may comprise various forms of symbols (e.g., barcodes, character strings, etc.) and provide substantially unique identification information. Substantially unique information as used herein means that the information is unique in normal use of the tokens. For example, after a period of time (e.g. days, months, or years) sufficient for operation as described herein, the information may repeat. Alternatively, the information may repeat after a certain amount of different number combinations have been used. Accordingly, a user may be confident that the information will identify only one token at a given time. Postage server system 110 may operate to generate the foregoing tokens or to select tokens from pregenerated tokens in response to requests for postage indicia from mobile communication handsets.

For example, postage server system 110 may utilize information included in the request and/or associated therewith to generate a token as used herein. Embodiments of postage server system 110 operate to use handset tying information and/or uniqueizing information in generating a token which has substantially unique identification information associated therewith. Such substantially unique identification information may be used in identifying the particular token (e.g., during validation, mail processing, etc.) and/or information associated therewith (e.g., account used to provide postage value, mail piece sender, mail piece recipient, services to be provided, etc.). For example, postage server system 110 may store information included in the request and/or associated therewith in association with substantially unique identification information for the token in unactivated tokens database 114 (e.g., when token is not activated) or in activated tokens database 115 (e.g., when the token is activated). Additionally or alternatively, postage server system 110 may provide token information (e.g., substantially unique identification information for tokens, their activation status, etc.) to other systems (e.g., activation system 130), such as via network 101.

Alternatively, postage server system 110 may select a pregenerated token, such as may be stored in unactivated tokens database 114, in response to a request for postage indicia. The pregenerated token preferably has substantially unique identification information associated therewith. In selecting a pregenerated token in accordance with embodiments of the invention, postage server system 110 may store information included in the request and/or associated therewith in association with substantially unique identification information for the selected token. For example, postage server system 110 may store information included in the request and/or associated therewith in association with substantially unique identification information for the token in unactivated tokens database 114 (e.g., when the token is not activated) or in activated tokens database 115 (e.g., when the token is activated).

Tokens may be activated by postage server system 110 when generated or selected for use, or thereafter. Activation of tokens as postage indicia is preferably performed when payment is received (e.g., an appropriate account is debited) for the postage value of the postage indicium. Postpaid systems may provide for activation of tokens as potage indicia when an appropriate postpaid account is incremented for the postage value of the postage indicium. Accordingly, when initially generated and unactivated, the substantially unique identification information of tokens 142 may be stored in database 112, such as part of the data of unactivated tokens database 114. Once a token is activated, however, the substantially unique identification information of a token is stored in activated tokens database 115, such as for use by validation system 130 in determining if postage value is associated with a particular token. Accordingly, as part of an activation process, substantially unique identification information for a previously unactivated token may be moved from unactivated tokens database 114 to activated tokens database 115.

Although shown as a single system for simplicity, postage server system 110 of embodiments may be implemented as a plurality of platforms. For example, separate platforms may be used to generate and print unactivated tokens and/or to activate tokens. Printing of tokens separately from activating the postage indicia as postage indicia may be particularly useful in scenarios where envelope manufacturers or other stock manufacturers include tokens for postage indicia on various forms of envelopes and/or other stationary items at the time of manufacture.

Figure 1B:
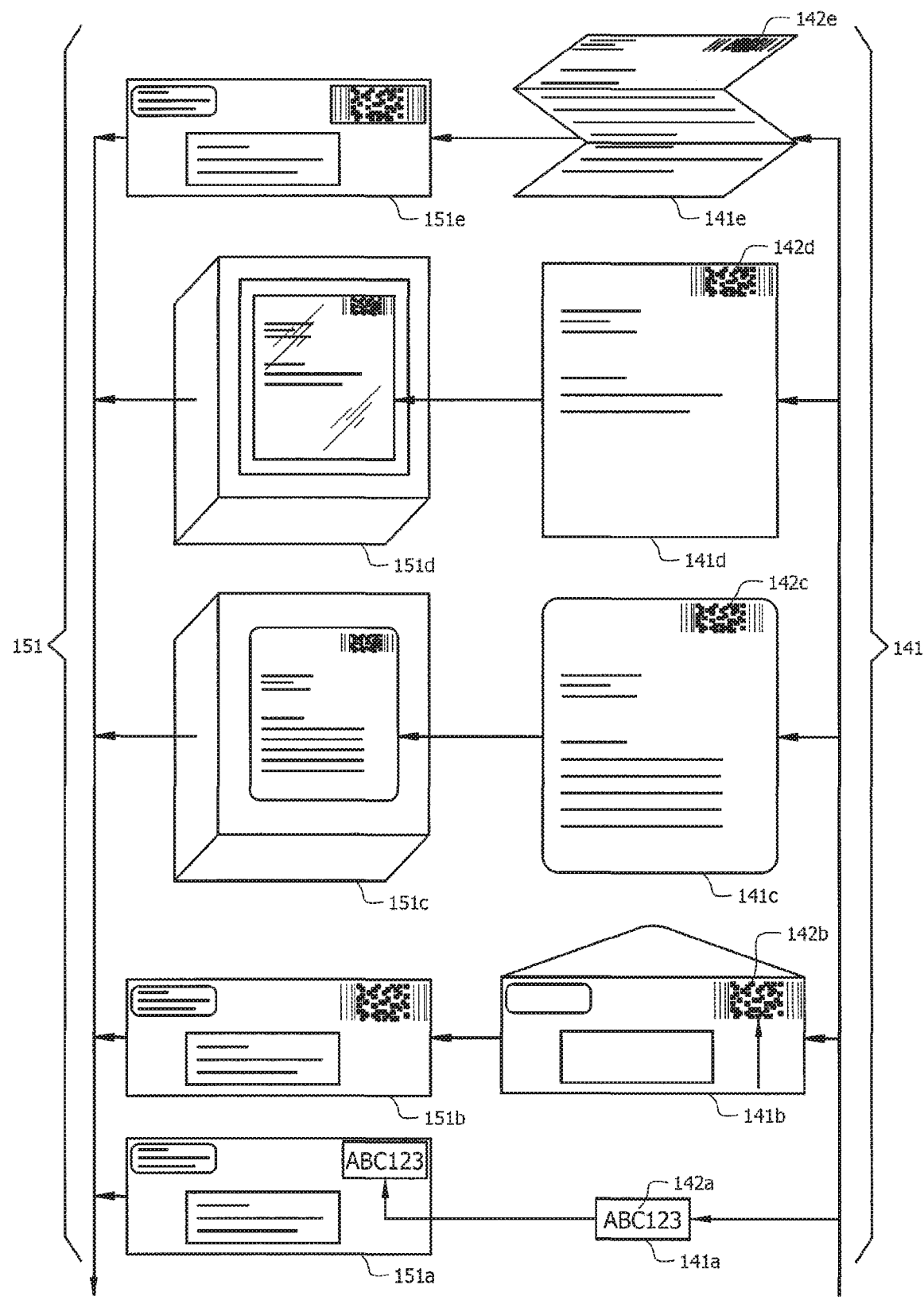
FIG. 1B shows detail with respect to tokens printed for use as postage according to embodiments of the invention.

As shown in the embodiment illustrated in FIGS. 1A and 1B, token 142 (examples of which are shown as tokens 142a-142e) is provided for use by a user as a postage indicium for posting mail piece 151, such as may comprise letters, parcels, flats, courier packets, etc. (examples of which are shown as mail pieces 151a-151e). In accordance with embodiments of the invention, token 142 may be provided for use by a user as a postage indicium through display of the token (e.g., output upon a display of mobile communication handset 124, such as for handwriting upon a mail piece) or through printing of the token (e.g., output by printing equipment 160 upon various media).

Token 142 may be provided in various formats (e.g., high resolution printing format, low resolution printing format, machine readable printing format, human readable printing format) adapted for particular uses. For example, token 142 may be provided in a human readable format (e.g., token 142a) to facilitate handwritten application upon a mail piece, verification by human viewing, etc. Additionally or alternatively, token 142 may be provided in a machine readable format (e.g., tokens 142b-142e, whether in high resolution, such as to facilitate high speed scanning with few errors, or in low resolution, such as to facilitate printing by a wide variety of printing technology) to facilitate machine processing, carrying a desired amount of data, etc.

Token 142 may be provided upon various media (examples of which are shown as mail piece stock 141a-141e) used with respect to a mail piece or mail pieces for which postage indicia is desired. For example, token 142a shown in FIG. 1B is printed upon mail piece stock 141a, such as may comprise a label, chemical transfer media, etc., which is used to transfer the token to mail piece 151a. Token 142b shown in FIG. 1B is printed upon mail piece stock 141b, such as may comprise an envelope, mailing flat, etc., which comprises a portion of mail piece 151b and is thus printed directly upon the mail piece, or portion thereof. Token 142c of FIG. 1B is printed upon mail piece stock 141c, such as may comprise a shipping label, manifest label, packing slip label, etc., which is applied to mail piece 151c. Token 142d of FIG. 1B is printed upon mail piece stock 141d, such as may comprise a plain paper shipping label, manifest, packing slip, etc., which is attached to mail piece 151d (e.g., placed in a clear or windowed packet applied to mail piece 151d). Token 142e of FIG. 1B is printed upon mail piece stock 141e, such as may comprise a document, letter, invoice, etc., which is included in mail piece 151e (e.g., inserted into a windowed envelope so that token 142e is visible).

It should be appreciated that token 142 may be provided alone or in combination with other information. For example, token 142 of embodiments may be provided with address information (e.g., as may be verified, updated, provided, etc. by postage server system 110) for printing in association with token 142. Information provided in association with token 142 may additionally or alternatively comprise document or form information, such as to provide printing of a complete shipping label, packing slip, manifest, etc.

Printing equipment 160 may comprise a printer, facsimile machine, photocopier, or other printing equipment which is accessible to a user of mobile communication handset 124 or which is otherwise available for printing tokens as used herein. For example, printing equipment 160 may comprise a network printer or network photo copier coupled to postage server system 110 via network 101 (e.g., using an IP packet switched connection). Additionally or alternatively, printing equipment 160 may comprise a facsimile machine coupled to postage server system 110 via network 101 (e.g., using a public switched telephone network (PSTN) connection).

Printing equipment 160 need not be in direct communication with, or even in indirect communication with, postage server 110 according to embodiments of the invention. For example, printing equipment 160 may comprise a peripheral within a LAN providing an indirect interface to postage server 110 via network 101. Printing equipment 160 or a device in communication therewith (e.g., a host computer system) may additionally or alternatively provide an interface (e.g., BLUETOOTH interface, WLAN interface, universal serial bus (USB) interface, etc.) to mobile communication handset 124 facilitating printing of token 142 by mobile communication handset 124.

Although printing equipment 160 may be equipment owned or operated by a user of mobile communication handset 124, it is envisioned that users obtaining postage in accordance with the concepts herein may be traveling or otherwise outside of their homes and offices and thus may utilize printing equipment which is not their own. Accordingly, publicly available or publically accessible printing may be utilized as printing equipment 160. For example, printing equipment available for use by patrons at a hotel business center, printing equipment available for use by patrons at a coffee shop or other Internet "hotspot", printing equipment of a service provider such as a print shop available for commercial use, etc. may be utilized as printing equipment 160.

Although such printing equipment may be specifically adapted for use in system 100 (e.g., adapted to communicate directly with postage server system 110, provided with special stock for printing tokens, utilize special inks for printing tokens, etc.), it should be appreciated that special adaptation of printing equipment need not be made according to embodiments of the invention. Accordingly, embodiments of the present invention utilize general purpose printing equipment, such as may comprise general purpose laser printers, inkjet printers, dot matrix printers, thermographic printers, xerographic machines, facsimile machines, and/or the like. Suitable mail piece stock, such as label stock, paper stock, etc., may be provided for use in printing tokens herein. It should be appreciated, however, that most any stock facilitating stable printed information may be used. For example, plain paper stock may be utilized according to embodiments of the invention, such as where the stock, or a portion thereof, may be disposed within a window (e.g., addressee window, addressor window, electronic postage indicia window, etc.) or other suitable feature (e.g., transparent packing slip envelope) of the mail piece.

The aforementioned tokens and/or additional or alternative items may be printed using special inks. For example, special ink colors (e.g., unique colored inks, inks which appear to shift color in changing light or viewing angles, etc.) and/or inks having special properties (e.g., fluorescent inks, phosphorescent inks, thermochormatic inks, magnetic inks, bi-stable inks, etc.) may be used in printing a token, or some portion thereof, such as to discourage counterfeiting, reproduction, etc.

Additional or alternative printed items as may be utilized according to embodiments of the invention. For example, in addition to the aforementioned tokens printed items, such as facing identification marks (FIMs), user or account identification information, etc., may be utilized according to embodiments of the invention. Postage server system 110 and/or mobile communication handset 124 of embodiments may operate to provide such additional printed items in association with token 142. The additional printed items may be printed using special inks as described above. It should be appreciated, however, that embodiments of the invention may utilize more traditional inks for printing tokens and/or additional or alternative printed items, as appropriate.

Validation system 130 preferably comprises a processor-based system, such as a computer having a CPU, memory (shown as including database 132), and appropriate input/output (I/O) devices and interfaces, operable under control of an instruction set defining operation as described herein. For example, validation system 130 may comprise server platform 131 having a processor from the CORE family of processors available from Intel Corporation, Santa Clara, Calif. Validation system 130 of the illustrated embodiments provides scanning and validation of activated tokens borne on or otherwise provided by mail pieces as described below. Accordingly, validation system 130 of the illustrated embodiments includes database 132 for storage of validation information (e.g., token identification and status) and mail piece scanner 133 for scanning and processing mail pieces.

It should be appreciated that configurations of validation system 130 other than that illustrated may be utilized according to embodiments of the invention. For example, mail piece scanner 133 may be coupled to postage server system 110, such as through network 101, for performing validation as described herein without server platform 131, if desired.

Validation system 130 may be utilized according to a number of techniques for processing tokens of embodiments of the invention. For example, an open loop technique may be implemented with respect to tokens herein whereby the tokens are scanned by validation system 130 and the mail piece allowed to continue in the mail stream. The token may subsequently be analyzed, such as by validation system 130 and/or postage server system 110, to determine if appropriate postage value is associated therewith. If a no postage value, or if a deficient postage value, is associated with the token an appropriate account (e.g., as may be identified by handset tying information or other information included in or associated with the token) may be debited accordingly. Additionally or alternatively, a closed loop technique may be implemented with respect to tokens herein whereby the tokens are scanned by validation system 130 and the mail piece not allowed to continue in the mail stream until the token is analyzed. For example, the token may be analyzed, such as by validation system 130 and/or postage server system 110, to determine if appropriate postage value is associated therewith. If appropriate postage value is associated with the token the mail piece may be allowed to continue in the mail stream. However, if no postage value, or if a deficient postage value, is associated with the token the mail piece may be prevented from continuing in the mail stream (e.g., returned to the sender) or the appropriate account (e.g., as may be identified by handset tying information or other information included in or associated with the token) may be debited before allowing the mail piece to continue in the mail stream.

Use of a validation system, such as validation system 130, is optional according to embodiments of the invention. However, to provide increased confidence as to the validity of postage indicia, and other information based indicia, embodiments of the invention implement a validation system. In order to reduce the volume of processing associated with such a validation system, embodiments of the invention may operate to validate a random or statistical sampling of indicia, rather than each indicia introduced into the mail stream.

Figure 2:
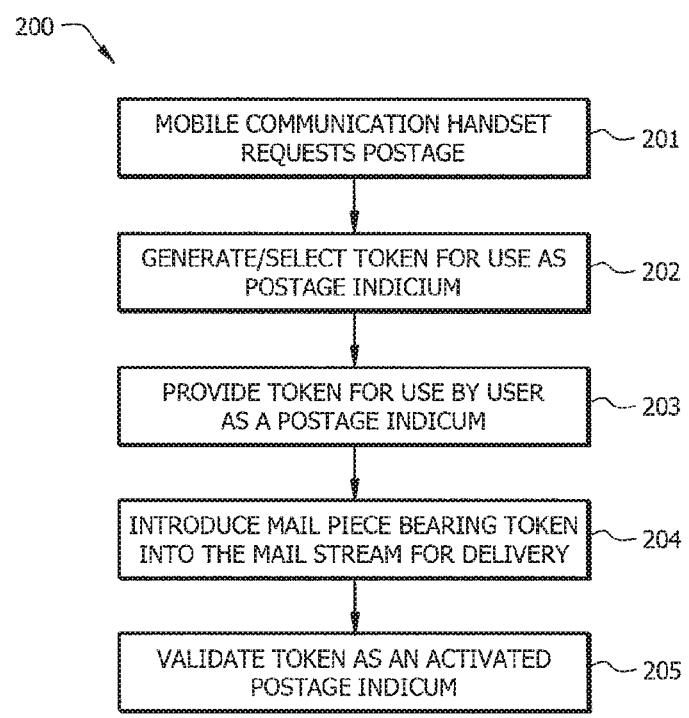
FIG. 2 shows a flow diagram of operation to provide postage according to an embodiment of the present invention.

Operation of embodiments of system 100 illustrated in FIG. 1A to provide postage indicia using mobile communication handsets according to the concepts herein is represented in the flow diagram of FIG. 2. According to the illustrated embodiment, a user utilizes mobile communication handset 124 to request postage at block 201 of flow 200. For example, an instruction set (e.g., a postage application or software) providing operation to facilitate acquisition of postage in accordance with the concepts herein may execute upon mobile communication handset 142 to guide a user through providing an appropriate request for postage and/or receiving a token to be used as postage indicium in response. Alternatively, one or more general purpose instruction set (e.g., a texting application, an electronic mail application, an Internet browser application, etc.) may be executed by or in association with mobile communication handset 124 to facilitate acquisition of postage herein.

The request preferably comprises or otherwise has associated therewith information regarding the desired postage (e.g., value, class of service, type of indicium, number of indicia requested, etc.). The request may additionally comprise information regarding the mail item for which the postage indicium is requested (e.g., weight, size, addressee, addressor, contents, etc.), information regarding the mobile communication handset (e.g., information identifying the handset, account information, location information, etc.), and/or the like. For example, a postage application operating upon mobile communication handset 124 may query a user regarding applicable information. Additionally or alternatively, such a postage application may obtain relevant information from other sources, such as a scale, imaging apparatus, memory registers, etc. Where a general purpose instruction set, such as a texting application or electronic mail application) is utilized, the user may include appropriate information within a message (e.g., in accordance with a predetermined protocol, using information delineators, etc.) to be transmitted as the request.

Requests according to embodiments of the invention may comprise or otherwise have associated therewith information regarding printing of a postage indicium provided in response thereto. For example, because a user is likely to utilize mobile communication handset 124 to obtain postage when traveling or otherwise not accessing more traditional office-type equipment of the user, information regarding particular printing equipment to be used in printing a resultant token for use as a postage indicium may be used to facilitate proper printing. Such printing information may comprise information regarding a print format (e.g., high resolution printing format, low resolution printing format, machine readable printing format, human readable printing format, etc.), printing equipment identification (e.g., phone number of a facsimile machine to be used in printing the postage indicium, network address of a printer to be used in printing the postage indicium, identification of a selected business service providing printing equipment to be used in printing the postage indicium, etc.), and/or the like. For example, a postage application operating upon mobile communication handset 124 may query a user regarding the type (e.g., printer type, graphics capable, print resolution, facsimile class, etc.) of printing equipment to be used, the type of mail piece stock (e.g., label stock, paper stock, envelope stock, flat stock, etc.) to be used, an address (e.g., MAC address, IP address, telephone number , etc.) for printing equipment to be used, and/or the like. Additionally or alternatively, a postage application may obtain relevant information from other sources. For example, a postage application operating upon mobile communication handset 124 may utilize a radio transceiver thereof to identify nearby wireless or network printing equipment, one or more database to identify printing equipment available for printing postage, etc. Where a general purpose instruction set, such as a texting application or electronic mail application) is utilized, the user may include appropriate printing information within a message (e.g., in accordance with a predetermined protocol, using information delineators, etc.) to be transmitted as the request.

The foregoing request is transmitted by mobile communication handset 124 to postage server system 110 for issuing of a token to be used as the desired postage indicium in response thereto. For example, a postage application may utilize a radio transceiver of mobile communication handset 124 to communicate the request to postage server system via base station 121 and network 101. Likewise, a short message service (SMS), electronic mail application, or other communication resource of mobile communication handset 124 may communicate the request for a postage indicium to postage server system 110 via base station 121 and network 101. Of course, wireline communication techniques (e.g., using a USB or network interface of mobile communication handset 124) may be utilized where available or otherwise appropriate.

At block 202 of flow 200 postage server system 110 operates to generate or select a token for use a postage indicium in response to the request. For example, in operation according to embodiments of the invention, postage server system 110 generates a token for use as the requested postage indicium using information included in the request and/or other information available to the postage server system. In operation according to other embodiments of the invention, postage server system 110 selects a preexisting token for use as the requested postage indicium and associates information included in the request and/or other information available to the postage server system with the selected preexisting token. Each such token is preferably unique or substantially unique so as to facilitate accurate validation, accounting, and/or auditing with respect to the activation and use thereof. Details with respect to the generation of tokens as may be generated or selected by postage server system 110 are provided in the above referenced patent applications entitled "Computer-Based Value-Bearing Item Customization Security" and "Systems and Methods for Facilitating Replacement of Computer-Based Value-Bearing Items."

The tokens utilized according to embodiments of the invention comprise, or have associated therewith, information identifying or otherwise tying the token to the particular mobile communication handset used in requesting postage indicia. For example, handset tying information, as may be provided in the aforementioned request, may be in the form of a code or symbol (e.g., barcode, character string, etc.) comprising information unique to the mobile communication handset and/or an account associated therewith, such as the mobile communication handset ESN, MIN, SIM unique serial number or ICCID, IMSI, handset telephone number, MAC address, IP address, etc. Handset tying information may be utilized for purposes such as accounting, tracking, auditing, and/or fraud detection with respect to postage indicia provided in accordance with embodiments of the invention. Such information may be included in and/or stored in correspondence to the particular token, such as in unactivated tokens database 114, activated tokens database 115 and/or database 132.

Additionally or alternatively, tokens utilized according to embodiments of the invention comprise substantially unique identification information, whether in the form of a code or symbol (e.g., barcode, character string, etc.) for identifying the particular token. For example, substantially unique identification information may comprise information identifying a mail piece (e.g., letter, envelope, package, etc.) to which the postage indicia is associated or may be arbitrary with respect to the mail piece. Substantially unique identification information may comprise the aforementioned handset tying information, or some portion thereof, in combination with uniqueizing information (e.g., sequence number, date/time information, information identifying a mail piece, etc.) to render the identification information substantially unique to the token. Such substantially unique identification information may be utilized for identifying the token for purposes such as accounting, tracking, auditing, and/or fraud detection with respect to postage indicia provided in accordance with embodiments of the invention. Such information may be included in and/or stored in correspondence to the particular token, such as in unactivated tokens database 114, activated tokens database 115 and/or database 132.

Machine readable embodiments of tokens 142 may comprise a bar code such as a PDF417 two dimensional barcode, a data matrix two dimensional barcode, a code 128 one dimensional barcode, a POSTNET (bar and half bar encoding) one dimensional barcode, an intelligent mail barcode (IMB) (e.g., height-modulated barcode), and/or the like encoding information such as the aforementioned handset tying information, substantially unique identification information, etc. Additional or alternative forms of machine readable symbology which may utilized according to embodiments of the invention include universal product code (UPC), code 93, dotcode, magnetic ink character recognition (MICR), etc. Tokens may additionally or alternatively be provided in other forms, such as human readable characters (e.g., letters, numerals, and/or symbols), graphic images, and/or the like. Machine readable embodiments of tokens 142 are provided in a form consistent with the information based indicia (IBI) acceptable to postal authorities, such as the United States Postal Service. Tokens 142 need not include all the information of a full IBI, such as where tokens 142 comprise a "light" IBI implementation.

A robust barcode such as the aforementioned PDF417 and data matrix barcodes are preferred according to embodiments of the invention in order to encode a relatively large amount of information therein, to provide data redundancy for error correction, to provide data security, etc. A one dimensional barcode such as the aforementioned POSTNET, IM, and code 128 barcodes are preferred according to some embodiments of the invention in order to provide encoded data in a form which is readily scanned using relatively inexpensive and/or which is widely available. Of course, multiple machine readable portions may be included as part of a machine readable token, such as to include a robust two dimensional barcode and a widely readable one dimensional barcode, to accommodate a large variety of use scenarios if desired.

As previously discussed, tokens 142 may include a code or other identifying information useful in uniquely identifying the tokens. For example, codes included in the tokens may include serial or sequence numbers, identification information, digital signatures, cryptographic keys, and/or the like useful in uniquely identifying the tokens and/or the postage indicia created therewith. Postage server system 110 preferably records such identification information in database 112, such as part of the data of unactivated tokens database 114, for use in activating tokens and/or verifying that postage value is associated therewith.

According to embodiments of the invention information, such as the activation status of tokens, is stored in database 112, such as part of the data of unactivated tokens database 114. For example, when tokens 142 are generated, postage server system 110 may store a unique code identifying each generated token in database 112 along with a status identifier indicating the tokens are "unactivated". As discussed below, the status identifier may be updated upon activation of the tokens when postage indicia has been activated to indicate the indicia are "activated". Such status identifiers may be useful with respect to validation of the indicia, as discussed further below. Additional or alternative information which may be stored in association with tokens may include identification of an entity or account for which the tokens were generated (e.g., a user requesting the tokens), identification of a system used to request the tokens, cryptographic keys used for encrypting/decrypting information in the tokens, digital signatures used to authenticate the tokens, information regarding geographic areas mail items bearing indicia using the tokens may be introduced into a mail processing stream and/or geographic areas mail bearing indicia using the tokens may be delivered to, particular services and/or levels of service indicia bearing the indicia may be used for, and/or the like. Such additional information may be used in an audit trail with respect to any particular token or indicium created in association therewith, used to detect fraud or abuse of tokens and indicia created in association therewith, used for accounting purposes, used to restrict or manage the use of tokens or indicia created in association therewith, etc.

For example, the handset tying information and/or substantially unique information of the tokens may be utilized to facilitate enhanced services according embodiments of the invention. Associating unactivated tokens with a particular user or user account may be utilized to facilitate payment for postage, and thus activation of the token, after a mail piece is introduced into the mail stream (e.g., if a user inadvertently fails to activate the token prior to introducing the mail piece into the mail stream). The use of a mobile communication handset in activating a token provides information regarding how the user may contacted, such as for automatically providing tracking information, delivery notification, etc.

Embodiments of postage server system 110 operate to provide processing in addition to the generation or selection of tokens for use as postage indicia in response to the aforementioned requests. For example, the foregoing tokens are to be activated as a postage indicium or postage indicium information, comprising value (referred to herein as postage value) associated therewith, to be used as the requested postage indicium. Accordingly, postage server system 110 of embodiments operates to activate unactivated token(s) to provide valid postage indicia at block 202 of flow 200 of embodiments.

In providing activation of the token, postage server system 110 preferably operates to change the status of one or more particular tokens 142 identified by the substantially unique identification information from "unactivated" to "activated." For example, postage server system 110 may locate the substantially unique code or other information in database 112 and change status information of tokens associated therewith, such as to indicate an activated state of the identified token by providing an activated state status indicator stored in association with the substantially unique identification information of the token. Embodiments may operate to change a status indicator stored in association with the substantially unique identification information, by moving the information from an "unactivated" portion of the database to an "activated" portion of the database, and/or the like. Accordingly, activation of a token may comprise moving data associated with that particular token from unactivated tokens database 114 to activated tokens database 115 and/or to database 132 of validation system 130. Such a change in status according to embodiments of the invention results in the corresponding tokens becoming indicative of valid postage indicia.

Such activation may be provided before transmission of the token to a user, after receipt of the token by the user, after introduction of an associated mail piece into the mail stream, etc. Activation according to embodiments of the invention is performed in association with debiting an appropriate account for an amount of the postage value. Alternatively, embodiments of the invention may utilize post-paid techniques, wherein activation of a token as postage indicium is performed prior to debiting a user's account for an amount of the postage value. However, accounting for postage value need not be done at or near the time of generating or selecting a token for use as a postage indicium or even at the time of activation of the token as a postage indicium. For example, embodiments of the invention may operate to account for postage value payment upon actual use of the postage indicia.

Processing of token information in addition to or in the alternative to the generation or selection of tokens for use as postage indicia in response to the aforementioned requests and changing a token state from "unactivated" to "activated" may be desired. For example, activation of tokens as postage indicia is preferably performed when payment is received (e.g., an appropriate account is debited) for the postage value of the postage indicium or, in the case of postpaid systems, when an appropriate postpaid account is incremented for the postage value of the postage indicium. Accordingly, embodiments of postage server system 110 preferably provide processing at block 202 of flow 200 to facilitate accounting for postage indicia. Embodiments of the invention may utilize information provided with the aforementioned request, such as mail piece weight, postal class, origination location information, destination information, and/or special handling instructions, in order to determine a postal rate, to provide statistical reporting, etc. Postage server system 110 may operate to debit an account (or otherwise account for postage value) for the appropriate postal value, such as using the aforementioned determined rate or the desired postage amount transmitted with or as part of the request. For example, user account information, user identification, handset tying information, mobile communication handset identification information, account identification information, etc. provided with the request may be utilized to determine an appropriate account from which to debit funds sufficient to provide remuneration for the posting of the mail piece.

An account from which funds for postage indicia activation are debited may be a postage account (e.g., an Internet postage meter account as provided by Stamps.com Inc.) associated with the user or other entity, with the token, with the mail piece, etc. Additionally or alternatively, an account from which funds for postage indicia activation are debited may not be a postage account, such as a communication services account, credit/debit card account, bank account, prepaid account, etc. associated with the user or other entity. In operation according to embodiments of the invention, a prepaid electronic commerce account (whether a prepaid postage account, a general purpose electronic commerce account, or otherwise) is stored by or in association with the mobile communication handset which is debited in association with activation of the token as a postage indicium. In accordance with one embodiment of the invention, the mobile communication handset may store one or more prepaid electronic commerce token specifically adapted for use in payment for activation of postage indicia according to the concepts herein. Other embodiments of the invention operate to increment a communication services account (e.g., a cellular telephone account) associated with the mobile communication handset in association with activation of the token as a postage indicium.

From the foregoing it can be appreciated that accounting for postage value payment may be made through incrementing an ascending register and decrementing a descending register, as is typical of a postage meter operation, or through a payment transaction more traditionally used outside of postage metering applications (e.g., without the use of secure ascending and descending registers). For example, prepaid accounts, postpaid accounts, electronic funds transfer, electronic commerce, and/or the like may be used according to embodiments of the invention. In operation according to embodiments of the invention, postage server system 130 implements a "zero balance" or accumulated postage type postage meter configuration facilitating postpaid postage activation. Details with respect to accumulated type postage meter configurations as may be adapted for use according to embodiments of the invention are shown and described in the above referenced patent application entitled "Postage Metering with Accumulated Postage."

Processing performed by postage server system 110 in addition to or in the alternative to the foregoing processing may comprise generation of information and/or making information available for use in validation of postage indicia. For example, postage server system 110 may provide access to, or information from, database 112 to validation system 130 for use in validating postage indicia which have been introduced into the mail processing stream. The foregoing information may, according to embodiments, include information in addition to information identifying activated tokens. Information, such as may include user identification, account information, etc., may be provided to validation system 130 for use in fraud detection, providing an audit trail, etc. IBI type indicia or the information thereof (e.g., comprising user account information, meter identification information, cryptographic digital signature information, postage value information, delivery destination information, and/or the like) may be desired by a delivery service provider for use with respect to security, accounting, validation, tracking, fraud detection, etc. Such postage indicia information may be collected and/or generated by postage server system 110 and provided to, or otherwise made available to, validation system 130 for use in validation according to embodiments of the invention.

Additional functions may be performed by or in response to a request for postage by mobile communication device 124 according to embodiments of the invention. For example, postage server system 110 may operate to dispatch a courier to retrieve mail pieces, scheduling postal processing resources, providing reports, etc. in coordination with activating one or more tokens herein.

Having generated or selected token 142 for use as a postage indicium in response to the request from mobile communication handset 124, postage server system 110 preferably provides the token for use as a postage indicium at block 203 of flow 200. In operation according to embodiments of the invention, postage server system 110 provides the token to a user for use as the requested postage indicium.

For example, postage server system 110 may transmit token 142 to printing equipment 160, as may be identified in the request or which is otherwise determined to be available for use in printing the token. Accordingly, mobile communication handset 124 need not have printing capabilities or even be interfaced with printing equipment. Postage server system 110 may transmit a message to mobile communication handset 124 or other user terminal (e.g., using SMS, electronic mail, or other communication resource) to provide notice that the token has been provided to printing equipment 160 and/or to provide information to locate or identify the particular printing equipment.

Additionally or alternatively, postage server system 110 may provide token 142 to mobile communication handset 124 or other user terminal (e.g., using SMS, electronic mail, or other communication resource). For example, token 142 may be provided to mobile communication handset 124 for printing under control of the user (e.g., using a wireless local area network (WLAN) connection, such as a WiFi or WiMAX network connection, a wired connection, a BLUETOOTH connection, etc.). Accordingly, mobile communication handset 124 may be utilized to control printing of token 142.

According to embodiments of the invention, token 142 is provided to mobile communication handset 124 for application upon the mail piece without the use of printing equipment, such as printing equipment 160. For example, token 142 may be output upon a display of mobile communication handset 124 for viewing by a user for handwriting upon mail piece 151.

The foregoing tokens, whether printed or handwritten, may be provided various stock. For example, token 142 may be provided upon any of various mail piece stock, such as mail stock (e.g., envelopes, flats, boxes, etc.), document stock (e.g., letter stock), label stock (e.g., postage indicia labels, address labels, etc.), and/or the like for inclusion with or as a mail piece.

Tokens of embodiments of the invention may be printed alone or in combination with various images, information, characters, symbols, ornamental images, and/or marks (collectively referred to as marks). For example, tokens may be printed alone, with one or more marks used to facilitate processing of indicia (e.g., a facing identification mark (FIM)), with human readable information, with one or more indicator marks, and/or the like. Such marks may be used in preparing mail items, processing mail items, for aesthetic or other purposes, etc.

At block 204 of flow 200 of the illustrated embodiment mail piece 151 bearing token 142 is placed into the mail stream for processing and delivery using the token as postage indicia. For example, a user may apply a label bearing token 142, as printed by printing equipment 160, to mail piece 151 and provide the mail piece to postal carrier 150 for handling by a delivery service provider (e.g., the USPS). There are many other ways, of course, that a mail piece bearing a token herein may be introduced into the mail stream.

Validation system 130 is used for processing tokens of embodiments of the invention once entered into the mail stream. Accordingly, tokens associated with mail pieces introduced into the mail stream, or a statistical sampling thereof, are preferably validated (e.g., before mail processing, during mail processing, and/or after mail processing) at block 205 of flow 200. For example, mail piece scanner 133 of validation system 130 may obtain information from one or more tokens present on mail piece 151 for use with information stored in database 112 and/or 132 (e.g., comparison of the scanned information to the stored information) in order to validate the token as an activated token having postage value associated therewith. Mail piece scanner 133 may thus comprise traditional optical scanner configurations, such as flat bed scanners, sheet fed scanners, handheld scanners, camera based scanners, or the like when indicia which is visible in natural light are used.

Where special inks are used, mail piece scanner 133 may be adapted to work with the characteristics of the special ink (e.g., illuminate fluorescent inks with the appropriate wavelength of light in order to cause the inks to fluoresce, illuminate phosphorescent inks with an appropriate light source to cause the inks to phosphoresce, shift the light source or optical receiver position to observe color shifts in color shifting inks, generate a magnetic field to detect the presence of magnet inks, etc.). Such operation of mail piece scanner 133 may be to facilitate scanning of the token and/or other printed items. Additionally or alternatively, such operation of mail piece scanner 133 may be to observe a resulting phenomena, such as for fraud or counterfeit detection.

It should be appreciated that mail piece scanners used in validating activated tokens may scan more than a token present on a mail piece. For example, additional information useful in validating the token, in creating an audit trail (e.g., destination address information, return address information, user/account identification information, etc.), in determining an account for payment for an under valued postage indicia (e.g., insufficient postage), unactivated token (e.g., introduced into the mail stream without having been activated), or postpaid activated token (e.g., activated without debiting an account for the postage value), etc. may be obtained from mail items by operation of a mail piece scanner.

According to embodiments of the invention, as a mail item is processed (e.g., at a mail service provider's mail processing station) after the mail item has been introduced into the mail stream, the mail piece is passed through mail piece scanner 133 for scanning tokens 142 to obtain information such as the aforementioned handset tying information, substantially unique identification information, etc. Validation system 130 may compare this information to information in database 132 and/or database 112 to determine if the token has been properly activated. Validation processing provided by validation system 130 may comprise analyzing information, such as postage indicia information, stored in association with an activated token record.

In providing the foregoing validation, validation system 130 may utilize the information to implement various validation techniques. Where a token has not been properly activated or proper postage value has not been provided, embodiments of validation system 130 may operate to perform activation and/or payment processing operations. Accordingly, validation system 130 may operate to perform postage value payment accounting, such as described above, upon detection of a postage indicia herein otherwise not having the postage value thereof accounted for.

As one example of a validation technique, validation system 130 may implement an open loop technique whereby mail pieces bearing the scanned tokens are allowed to continue in the mail stream. Validation system 130 and/or postage server system 110 may thereafter provide processing to determine if the token has been properly activated, if appropriate postage value (e.g., as indicated by an associated postage indicium or postage indicium information) is associated therewith, etc. If a no postage value is associated with the token (e.g., the token is an unactivated token) or if a deficient postage value is associated with the token (e.g., the token is activated but an amount of postage value which is improper for the associated mail piece has been provided) an appropriate account may be debited (e.g., by operation of validation system 130 and/or postage server system 110). For example, information regarding the user (e.g., user identification information), the mobile communication handset (e.g., handset tying information) used with respect to the token, etc. may be utilized to identify an appropriate account from which to obtain funds for proper activation of the token.

As another example of a validation technique, validation system 130 may implement a closed loop technique whereby the tokens are scanned and the mail piece not allowed to continue in the mail stream until the token is analyzed. For example, the token may be analyzed, such as by validation system 130 and/or postage server system 110, to determine if appropriate postage value (e.g., as indicated by an associated postage indicium or postage indicium information) is associated therewith. If the token is determined to be valid (e.g., activated and having an appropriate postage value associated therewith), validation system 130 may allow the mail item to pass for further processing (e.g., processing for delivery to an appropriate destination address). However, if the postage indicium is not valid (e.g., the token is unactivated or does not have an appropriate postage value associated therewith), validation system 130 may prevent further processing (e.g., direct the mail item to a "return to sender" bin). If desired, such a closed loop system may operate to activate a token determined to be unactivated, as discussed above, and thus allow the mail item to continue in the mail stream after such activation has been performed.

Validation system 130 and/or postage server system 110 may provide processing in addition to or in the alternative to validation processing after a mail piece has been introduced into the mail stream. For example, various audit processing may also be performed by activation sever system 110 and/or validation system 130, such as to detect fraud or abuse of indicia, used for accounting purposes, etc., using the aforementioned token information and/or indicia information during processing of mail items or thereafter. Such additional processing may additionally or alternatively include providing a user with tracking information regarding a mail piece, notifying a user of the detected misuse of indicia, statistical analysis of indicia usage (e.g., to detect fraud or attempted fraud), etc. It should be appreciated that information regarding a mobile communication device utilized in obtaining postage may be collected by system 100 for use in providing tracking information, reporting information, etc. to a user regarding a mail piece associated with a particular token.

From the above it can be seen that operation according to the embodiment of FIG. 2 provides postage indicia for mailing documents using a mobile communication handset. A user utilizing the embodiments as described with reference to FIG. 2 is enabled to introduce mail pieces into a mail delivery stream which are accepted as having activated, value comprising postage indicia associated therewith without the use of traditional metering systems or processor-based postage generation and printing systems. Because a mobile communication handset is utilized in activating tokens according to embodiments, the user is enabled to obtain postage for mail pieces at any time and in any place.

Although embodiments have been described above with respect to mobile communication handset 124, postage server system 110, and/or validation system 130 performing operation to debit an appropriate account for postage value associated with postage indicia activated herein, it should be appreciated that such account debts may be performed by systems other than those identified above. For example, any of mobile communication handset 124, postage server system 110, and/or validation system 130 may track or record information regarding amounts of postage value associated with postage indicia activation and provide this information (e.g., on a postage indicia activation transaction by transaction basis, in batch, periodically, etc.) to one or more external systems (e.g., a payment processing center, such as a credit card payment center, an electronic commerce payment center, etc.) for debiting appropriate accounts for postage value.

It should be appreciated that embodiments of the invention may collect value or fees in addition to a postage amount. For example, embodiments of the invention may implement one or more of the foregoing funding techniques to collect a surcharge for the service of postage indicia activation as described herein.

Although various embodiments have been described above as providing tokens in response to a request for postage, it should be appreciated that not all such requests may result in activation of a token. For example, where a user account associated with the request has insufficient funds to provide remuneration for the requested postage, and possibly a charge for this service, a request may be denied and no token provided (or providing of a token delayed) until the funding issue is resolved. Security and other features restricting the acquisition of tokens may similarly result in failure to provide a token in response to a request for postage. For example, a user may request that postage server system 110 be configured to provide postage associated with the user's account only in response to requests originating from one or more particular mobile communication handset (e.g., using electronic serial number, SIM information, telephone number, MAC address, etc.), to reduce the risk of fraudulent postage requests.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for facilitating on-demand mobile device postage printing and user access to printed postage indicium despite the mobile device's lack of direct communication with a suitable postage printer, the system comprising:

a server-side computer system comprising one or more processors programmed with computer program instructions that, when executed, cause the computer system to:

obtain, from a mobile device, a postage request for a postage indicium having postage value;

obtain, from the mobile device, device location information associated with the mobile device and device identification information associated with the mobile device, the device location information indicating a location of the mobile device, and the device identification information comprising an electronic serial number, subscriber identification module identifier, telephone number, or media access control address associated with the mobile device;

determine, based on the device identification information, postage indicium data for the postage indicium of the postage request wherein determining the postage indicium data comprises using the device identification information to generate the postage indicium data for the postage indicium such that the postage indicium data indicates the electronic serial number, subscriber identification module identifier, telephone number, or media access control address associated with the mobile device;

cause printing instructions to be provided to a printer to print the postage indicium without the mobile device having a wired or wireless connection to printer, the printing instruction comprising the postage indicium data and being provided to the printer based on (i) the determination of the postage indicium data and (ii) proximity of the printer to the location of the mobile device indicated by the device location information; and cause, in conjunction with the printing of the postage indicium, printer location information to be provided to the mobile device for presentation on a user interface of the mobile device, the printer location information indicating a location of the printer.

2. The system of claim 1, wherein determining the postage indicium data comprises using the device identification information to obtain the postage indicium data for the postage indicium.

3. The system of claim 1, wherein the server-side computer system is caused to:

determine the printer as a given printer to be used to print the postage indicium based on the proximity of the printer to the location of the mobile device indicated by the device location information, wherein causing the printing instruction to be provided to the printer comprises causing the printing instructions to be provided to the printer, to print the postage indicium without the mobile device having a wired or wireless connection to printer, based on (i) the determination of the postage indicium data and (ii) the determination of the printer.

4. The system of claim 1, wherein the server-side computer system is caused to:

validate the postage request based on the device identification information, wherein causing the printing instruction to be provided to the printer comprises causing the printing instructions to be provided to the printer, to print the postage indicium without the mobile device having a wired or wireless connection to printer, based on (i) the determination of the postage indicium data, (ii) proximity of the printer to the location of the mobile device indicated by the device location information, and (iii) the validation of the postage request.

5. The system of claim 4, wherein validating the postage request comprises determining, based on the device identification information, that the postage request originated from the mobile device, and wherein causing the printing instruction to be provided to the printer comprises causing the printing instructions to be provided to the printer, to print the postage indicium without the mobile device having a wired or wireless connection to printer, based on (i) the determination of the postage indicium data, (ii) proximity of the printer to the location of the mobile device indicated by the device location information, and (iii) the determination that that the postage request originated from the mobile device.

6. The system of claim 5, wherein the server-side computer system is caused to:

determine, based on the device identification information, an account associated with the mobile device for processing payment for the postage value;

causing the account to be charged based on the determination that that the postage request originated from the mobile device.

7. The system of claim 1, wherein the postage request indicates a type of mail piece stock that is to be used to print the postage indicium.

8. The system of claim 7, wherein the type of mail piece stock indicated by the postage request comprises document stock.

9. The system of claim 7, wherein the type of mail piece stock indicated by the postage request comprises label stock.

10. A method for facilitating on-demand mobile device postage printing and user access to printed postage indicium despite the mobile device's lack of direct communication with a suitable postage printer, the method being implemented by a server-side computer system comprising one or more processors executing computer program instructions that, when executed, perform the method, the method comprising:

obtaining, by the server-side computer system, from a mobile device, a postage request for a postage indicium having postage value;

obtaining, by the server-side computer system, from the mobile device, device location information associated with the mobile device and device identification information associated with the mobile device, the device location information indicating a location of the mobile device, and the device identification information comprising an electronic serial number, subscriber identification module identifier, telephone number, or media access control address associated with the mobile device;

determining, by the server-side computer system, based on the device identification information, postage indicium data for the postage indicium of the postage request wherein determining the postage indicium data comprises using the device identification information to generate the postage indicium data for the postage indicium such that the postage indicium data indicates the electronic serial number, subscriber identification module identifier, telephone number, or media access control address associated with the mobile device;

causing, by the server-side computer system, printing instructions to be provided to a printer to print the postage indicium without the mobile device having a wired or wireless connection to printer, the printing instruction comprising the postage indicium data and being provided to the printer based on (i) the determination of the postage indicium data and (ii) proximity of the printer to the location of the mobile device indicated by the device location information; and causing, by the server-side computer system, in conjunction with the printing of the postage indicium, printer location information to be provided to the mobile device for presentation on a user interface of the mobile device, the printer location information indicating a location of the printer.

11. The method of claim 10, wherein determining the postage indicium data comprises using the device identification information to obtain the postage indicium data for the postage indicium.

12. The method of claim 10, further comprising:

determining, by the server-side computer system, the printer as a given printer to be used to print the postage indicium based on the proximity of the printer to the location of the mobile device indicated by the device location information, wherein causing the printing instruction to be provided to the printer comprises causing the printing instructions to be provided to the printer, to print the postage indicium without the mobile device having a wired or wireless connection to printer, based on (i) the determination of the postage indicium data and (ii) the determination of the printer.

13. The method of claim 10, wherein the server-side computer system is caused to:
validating, the server-side computer system, the postage request based on the device identification information,
wherein causing the printing instruction to be provided to the printer comprises causing the printing instructions to be provided to the printer, to print the postage indicium without the mobile device having a wired or wireless connection to printer, based on (i) the determination of the postage indicium data, (ii) proximity of the printer to the location of the mobile device indicated by the device location information, and (iii) the validation of the postage request.

14. The method of claim 13, wherein validating the postage request comprises determining, based on the device identification information, that the postage request originated from the mobile device, and
wherein causing the printing instruction to be provided to the printer comprises causing the printing instructions to be provided to the printer, to print the postage indicium without the mobile device having a wired or wireless connection to printer, based on (i) the determination of the postage indicium data, (ii) proximity of the printer to the location of the mobile device indicated by the device location information, and (iii) the determination that that the postage request originated from the mobile device.

15. The method of claim 14, wherein the server-side computer system is caused to:
determine, based on the device identification information, an account associated with the mobile device for processing payment for the postage value;
causing the account to be charged based on the determination that that the postage request originated from the mobile device.

16. The method of claim 10, wherein the postage request indicates a type of mail piece stock that is to be used to print the postage indicium.

17. The method of claim 16, wherein the type of mail piece stock indicated by the postage request comprises document stock.

18. The method of claim 16, wherein the type of mail piece stock indicated by the postage request comprises label stock.

* * * * *